(12) United States Patent
Palaniappan

(10) Patent No.: US 11,350,255 B2
(45) Date of Patent: May 31, 2022

(54) SYSTEM FOR MANAGING MOBILE STATION INTERNATIONAL SUBSCRIBER DIRECTORY NUMBER STORAGE

(71) Applicant: T-Mobile USA, Inc., Bellevue, WA (US)

(72) Inventor: Murugappan Palaniappan, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 17 days.

(21) Appl. No.: 17/131,397

(22) Filed: Dec. 22, 2020

(65) Prior Publication Data

US 2021/0120381 A1 Apr. 22, 2021

Related U.S. Application Data

(62) Division of application No. 16/939,355, filed on Jul. 27, 2020, now Pat. No. 10,880,707, which is a division of application No. 16/417,087, filed on May 20, 2019, now Pat. No. 10,750,335.

(51) Int. Cl.
*H04W 4/24* (2018.01)
*H04W 8/20* (2009.01)
*H04M 15/00* (2006.01)

(52) U.S. Cl.
CPC .............. *H04W 4/24* (2013.01); *H04M 15/41* (2013.01); *H04M 15/58* (2013.01); *H04M 15/66* (2013.01); *H04M 15/67* (2013.01); *H04W 8/205* (2013.01)

(58) Field of Classification Search
CPC ...... H04M 15/00; H04M 17/00; G06Q 20/20; H04L 12/1453; H04L 41/0893; H04W 4/24
See application file for complete search history.

(56) References Cited

U.S. PATENT DOCUMENTS

| | | | | |
|---|---|---|---|---|
| 6,092,055 | A * | 7/2000 | Owens | G06Q 10/0875 705/34 |
| 10,560,581 | B1 * | 2/2020 | Shah | H04W 4/24 |
| 2005/0009500 | A1 * | 1/2005 | Ear | H04M 15/00 455/408 |

(Continued)

*Primary Examiner* — Joshua L Schwartz
(74) *Attorney, Agent, or Firm* — Lee & Hayes, P.C.

(57) ABSTRACT

Systems, methods, and apparatuses may include a Billing System (BS) node, Charging System (CS) node, and a mediation node for managing Mobile Station International Subscriber Directory Numbers (MSISDN)s for a telecommunication network. The system may make an MSISDN available for reassignment immediately or shortly after (e.g., seconds, minutes, days, or weeks after) receiving a cancelation request associated with the MSISDN. For instance, upon receiving the cancelation request, the system may store a line identifier with an association to the MSISDN and/or an International Mobile Subscriber Identity (IMSI) in a line identifier database, and the system may delete the MSISDN/IMSI from a user account database. The system may receive a Telephone Account Procedure (TAP) Call Detail Record (CDR) associated with the MSISDN/IMSI after receiving the cancelation request. Accordingly, the system may use the line identifier stored in the line identifier database to generate a billing report corresponding to the TAP CDR.

20 Claims, 6 Drawing Sheets

(56) References Cited

U.S. PATENT DOCUMENTS

| | | | |
|---|---|---|---|
| 2006/0004658 A1* | 1/2006 | Chau | G06Q 10/08 705/40 |
| 2006/0235773 A1* | 10/2006 | Nelson | G06Q 40/02 705/30 |
| 2007/0297340 A1* | 12/2007 | Maes | H04L 12/14 370/252 |
| 2011/0045828 A1* | 2/2011 | Madan | H04Q 3/0045 455/433 |
| 2013/0122882 A1* | 5/2013 | Patel | H04L 41/0886 455/418 |
| 2016/0183178 A1* | 6/2016 | Marimuthu | H04W 4/023 455/432.1 |
| 2020/0374670 A1 | 11/2020 | Palaniappan | |

* cited by examiner

SYSTEM FOR MANAGING MOBILE STATION INTERNATIONAL SUBSCRIBER DIRECTORY NUMBER STORAGE

CROSS REFERENCE TO RELATED APPLICATIONS

This is a divisional application which claims priority to commonly assigned, co-pending U.S. patent application Ser. No. 16/939,355, filed Jul. 27, 2020, which is a divisional application of U.S. patent application Ser. No. 16/417,087, filed May 20, 2019, now U.S. Pat. No. 10,750,335 issued Aug. 18, 2020. Application Ser. Nos. 16/939,355 and 16/417,087 and U.S. Pat. No. 10,750,335 are all fully incorporated herein by reference.

BACKGROUND

Telecommunication service providers operating 3rd Generation Partnership Program (3GPP) networks often use multiple nodes to manage Mobile Station International Subscriber Director Numbers (MSISDN)s (e.g., phone numbers), to manage user accounts assigned to the MSISDNs, and to generate billing reports for the user accounts based on phone calls associated with the MSISDNs. The nodes must perform multiple operations to accommodate different types of usage information originating from different service providers, for instance, via a Telephone Account Procedure (TAP).

For instance, a TAP Call Detail Record (CDR) originating from a region outside the United States may arrive at a node in the United States of the service provider managing MSISDNs months after the network usage represented by the TAP CDR occurred. For example, a user with an MSISDN assigned to a user account with a U.S. carrier may make a phone call while traveling abroad. The phone call may be facilitated by a network of a non-U.S. carrier operating in the country of the phone call. As noted above, the process for generating the TAP CDR for the phone call and delivering it to U.S. carrier responsible for billing the MSISDN associated with the phone call may take months.

The user may cancel a phone plan or subscription associated with the user account of the service provider (e.g., the U.S. carrier). However, because of the possibility of receiving delayed CDRs after canceling the user account, the service provider node(s) typically stores the MSISDN with the association to the user account for an additional period of, for instance, 60-90 days after receiving the cancelation request. During this additional period, the MSISDN is unavailable to be reassigned to a different user account. Furthermore, in instances where the MSISDN is associated with a post-paid plan, the node(s) must store charging information associated with the post-paid plan as well.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
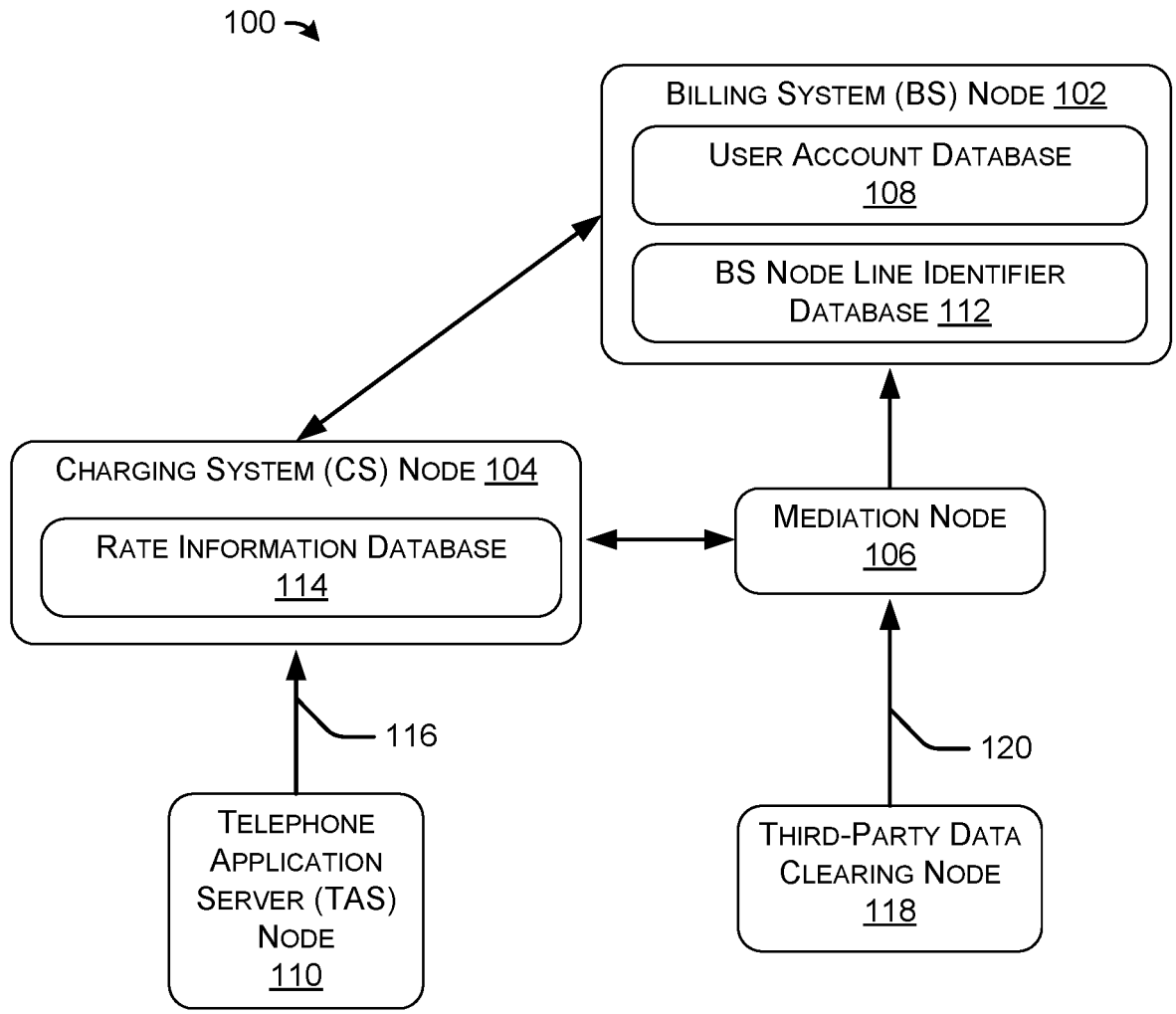
FIG. 1 depicts example systems, methods, and apparatuses for managing Mobile Station International Subscriber Directory Number storage for a telecommunication network including at least a Billing System node, a Charging System node, and a mediation node.

Systems, methods, and apparatuses (hereinafter the "system") disclosed herein may include a Billing System (BS) node, Charging System (CS) node, and a mediation node for managing Mobile Station International Subscriber Directory Numbers (MSISDN)s for a telecommunication network. The BS node may perform operations for storing user account information and generating billing reports. The CS node may perform operations for applying a charging rate to usage information received in a Call Detail Records (CDR)s to generate rated CDRs. The mediation node may perform operations for formatting CDRs received at the mediation node to generate modified CDRs according to formatting requirements of the other nodes (e.g., the BS node or the CS node). The system disclosed herein may improve MSISDN management by making an MSISDN available for reassignment immediately or shortly after (e.g., minutes, days, or weeks after) receiving a cancelation request associated with the MSISDN. The system may shift memory and processing requirements of the BS node to the CS node, improving the functioning of the BS node. For instance, the system may shift rate charging information (e.g., a charging rate) for a post-paid plan associated with the MSISDN to the CS node upon receiving the cancelation request. In some instances, the BS node may shift responsibility for applying charging information to the CS node via a node alias (e.g., a line identifier).

In some examples, the BS node may store an MSISDN in a user account database with a first association to a user account. In some instances, the BS node may store the charging rate for the post-paid plan associated with the user account. Upon receiving a cancelation request, the BS node may store a line identifier at a BS node line identifier database with a second association to the MSISDN and/or an International Mobile Subscriber Identity (IMSI) . In some instances, multiple IMSI(s) may be associated with the MSISDN, and/or multiple MSISDN(s) may be associated with the IMSI. The BS node may remove, from the user account database, the first association, the MSISDN, and/or the IMSI. In some instances, the BS node may replace the MSISDN with the line identifier in the user account database associated with the user account. The BS node line identifier database may comprise a separate database from the user account database so that the MSISDN can be immediately deleted from the user account database upon being stored in the BS node line identifier database. Accordingly, the system may make the MSISDN, which may be a scarce resource in highly populated areas, available for reassignment without substantial delay, improving MSISDN management of the system. The BS node may store a cancelation timestamp associated with line identifier, the MSISDN, the IMSI and/or canceling the first association. The BS node may send, to the CS node and/or the mediation node, an adjustment message indicating the second association and/or the cancelation timestamp.

In some instances, the CS node, at least partly in response to receiving the adjustment message, may store the line identifier in a rate information database. For instance, the CS node may replace, in the rate information database, the MSISDN with the line identifier, such that the line identifier is associated with a charging rate in the rate information database that was previously associated with the MSISDN. The charging rate may comprise a post-paid plan charging rate received from the adjustment message. The CS node may replace the MSISDN with the line identifier in the rate information database. Additionally, or alternatively, in some instances, the CS node may store an association of the charging rate to the line identifier. In some embodiments, the CS node may send, to the mediation node, an adjustment CDR indicating the second association of the MSISDN and/or the IMSI(s) associated with the line identifier and, in some instances, the cancelation timestamp.

In some embodiments, the mediation node may receive the adjustment CDR and store, at a mediation node line identifier database, the second association of the MSISDN and/or the IMSI(s) associated with the line identifier. In some instances, the mediation node may store the cancelation timestamp with an association with the line identifier, the MSISDN, and/or the IMSI(s).

In some examples, the system may receive a Telephone Account Procedure (TAP) CDR. For instance, the mediation node may receive the TAP CDR from a third-party data clearing node. The TAP CDR may indicate usage information associated with the MSISDN and/or the IMSI(s) and a usage timestamp. The mediation node may determine whether the usage timestamp indicates a first time occurring prior to a second time indicated by the cancelation timestamp, and, if yes, may determine to send a modified TAP CDR to the CS node or the BS node indicating the line identifier (e.g., instead of the MSISDN) and the usage information.

In some embodiments, the CS node may receive the modified TAP CDR and, based on the line identifier indicated by the modified TAP CDR, determine the charging rate stored in the rate information database associated with the line identifier. The CS node may apply the charging rate to the usage information to generate rated usage information indicating a balance owed by a user associated with the user account. The CS node may generate and send a rated TAP CDR indicating the rated usage information and the line identifier to the mediation node.

In some examples, the mediation node may receive the rated TAP CDR. The mediation node may determine that the BS node is a terminating node of the rated TAP CDR (e.g., intended recipient), and may apply formatting rules associated with the BS node to the rated TAP CDR, generating a modified rated TAP CDR. The modified rated TAP CDR may include, in accordance with BS node formatting rules, an indication of the rated usage information with an association to the line identifier. The modified rated TAP CDR and/or the rated TAP CDR may omit the MSISDN. The mediation node may send the modified rated TAP CDR to the BS node. In some examples, the mediation node may send a message, e.g., to an archive node for legal and/or accounting recordation, indicating the usage information, the rated usage information, the MSISDN, the line identifier, the line identifier replaced with the MSISDN, the MSISDN replaced with the line identifier, the association of the MSIDN and/or the IMSI(s) with the line identifier, the usage timestamp, the cancelation timestamp, or combinations thereof.

The BS node may receive the modified rated TAP CDR. The BS node may receive the line identifier from the modified rated TAP CDR, and determine that the line identifier is associated with the MSISDN based on the association of the line identifier with the MSISDN and/or the IMSI stored at the BS node line identifier database. Accordingly, the BS node may generate, based on the line identifier received in the modified rated TAP CDR, a billing report for the user account, for instance, the user account that was associated with the MSISDN prior to receiving the cancelation request. The BS node may send the billing report to a location associated with the user account. A system including the BS node, the CS node, the mediation node, and operations thereof are discussed in greater detail below.

FIG. 1 depicts an example system 100 for managing MSISDN storage for a telecommunication network, such as a 3rd Generation Partnership Program (3GPP) network. For instance, the system 100 may manage MSISDN storage for a 3G network, a 4G network, a 4G Long Term Evolution (LTE) network, a LTE Advanced network, a 5G network, an evolved IP Multimedia System (IMS) network, combinations thereof, and the like. The system 100 may include a Billing System (BS) node 102, which may communicate with a Charging System (CS) node 104 and/or a mediation node 106.

In some examples, the BS node 102 may generate and/or send billing reports based on MSISDNs associated with user accounts (e.g., stored at a user account database 108) and/or one based on or more Call Detail Records (CDR)s received at the BS node 102 (e.g., modified CDRs received from the mediation node 106). A CDR of the one or more CDRs may comprise a data record produced, for instance by a telephone exchange or other telecommunications equipment of a service provider. The CDR may document details of a telephone call or other telecommunications transaction (e.g., Short Message Service (SMS) message) that passes through the equipment. In some examples, the CDR may originate from a Telephone Application Server (TAS) node 110. The BS node 102 may comprise a record-keeping archive of received CDRs and/or generated billing report(s). The BS node 102 may include a BS node line identifier database 112 for storing line identifiers associated with MSISDNs 206 and/or one or more IMSI(s) 207.

In some embodiments, the CS node 104 may store one or more MSISDN(s) associated with corresponding charging rate(s) that reflect payment plans and/or billing rates for the MSISDNs (e.g., to apply to usage information associated with the MSISDN). The CS node 104 may generate rated CDRs based on CDRs received at the CS node 104 (e.g., unrated CDRs received from the mediation node 106 and/or from the TAS node 110). Upon receiving a CDR indicating usage information associated with a particular MSISDN, the CS node may determine a particular charging rate corresponding to the particular MSISDN (e.g., by matching an MSISDN indicated by the CDR with an MSISDN stored in a rate information database 114). The CS node may apply the charging rate to the usage information in order to generate a rated CDR, e.g., a CDR indicating a balance of debt owed by the user account associated with MSISDN.

In some examples, the mediation node 106 may generate modified (e.g., formatted) CDRs, for instance, based on CDR (e.g., rated or unrated CDRs) received at the mediation node 106. For instance, a CDR 116 may be sent from the TAS node 110 to the CS node 104. The CS node 104 may apply the charging rate to the CDR 116 to generate a rated CDR, which the CS node may send to the mediation node 106. The mediation 106 node may modify the rated CDR received from the CS node 104 to match formatting requirements of the BS node 102, and generate a modified rated CDR to send to the BS node 102.

In some embodiments, the system 100 may comprise a third-party data clearing node 118. The third-party data clearing node 118 may receive one or more Transferred Account Procedure (TAP) CDR(s) 120, for instance, from an international service provider and/or from a third-party service provider that is different from the service provider operating the BS node 102, the CS node 104, and/or the mediation node 106. The third-party data clearing node 118 may send the TAP CDR(s) 120 to the mediation node 106.

Figure 2:
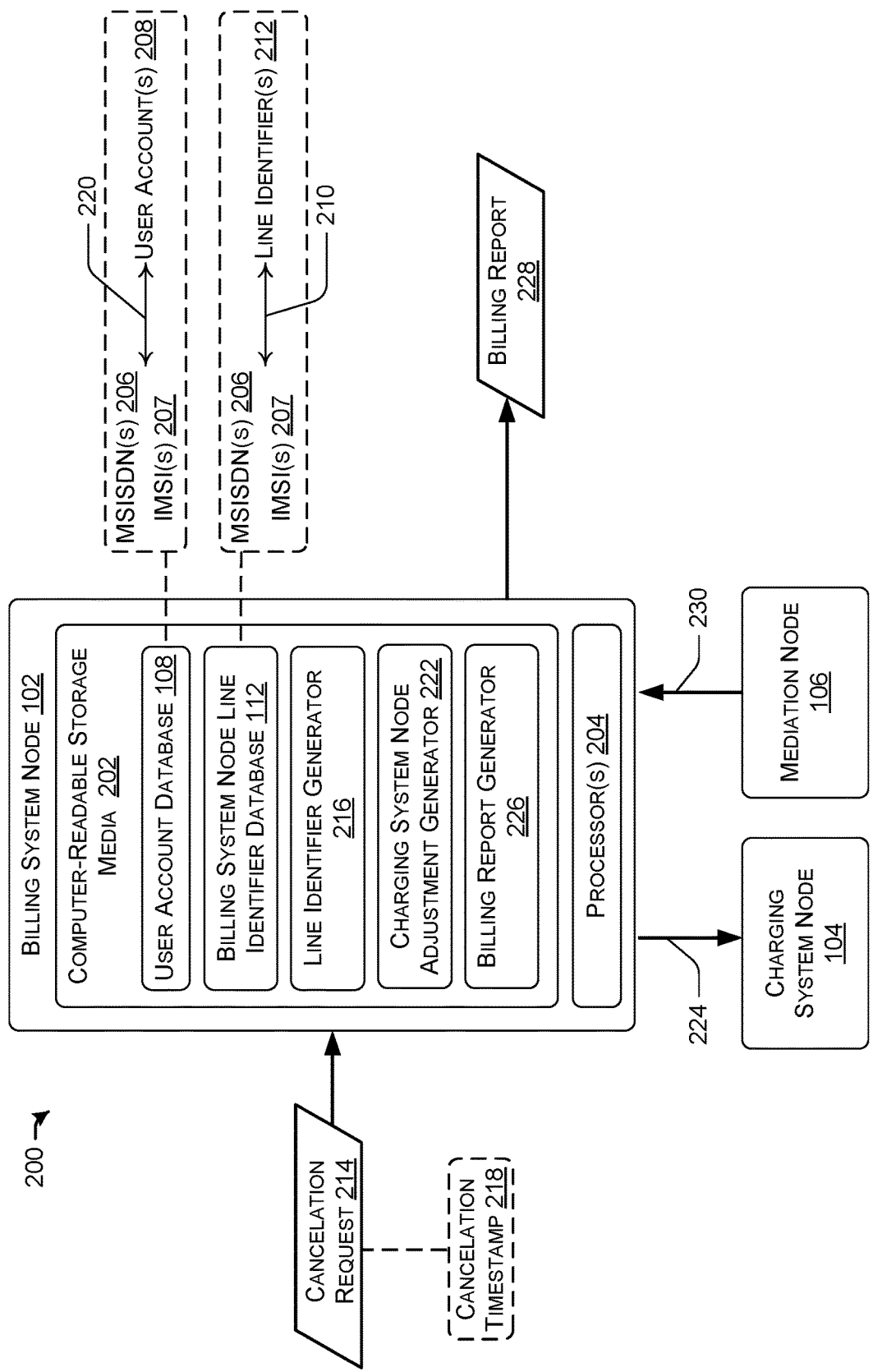
FIG. 2 depicts a schematic diagram of an example Billing System node, and operations of the Billing System node, the Charging System node and the mediation node, which may form at least a portion of a system of FIG. 1.

FIG. 2 depicts a schematic diagram of an example system 200 including at least the BS node 102. FIG. 2 depicts one or more components of the BS node 102, one or more operations performed by the BS node 102, and one or more messages, CDRs, and other data transmissions between the BS node 102 and other nodes (e.g., the CS node 104 and the mediation node 106) of the system 100.

In some instances, the BS node 102 may comprise one or more computer-readable storage media 202, such as non-transitory computer-readable media including, but not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, a quantum-state storage device, genetic encoding storage device, combinations thereof, or any other medium that can be used to store information for access by an electronic computing device. Databases discussed herein, for instance stored at computer-readable storage media 202, may include one or more of a comma delimited list, a spreadsheet, an array, a NoSQL data structure, a hash-based data structure, an object-based data structure, or any other data type, data structure, and/or data system for storing retrievable data.

In some examples, The BS node 102 may comprise one or more processor(s) 204, such as a microprocessor, a microcomputer, a microcontroller, a digital signal processor, a central processing unit (CPU), a graphics processing unit (GPU), a quantum processor, combinations thereof, etc. Among other capabilities, the one or more processor(s) 204 may operate to fetch and execute computer-readable instructions stored in the one or more memory storage device(s) 202, for instance, to perform the operations disclosed herein.

In some examples, the BS node 102 may store, for instance at computer-readable storage media 202, the user account database 108, which may store associations of one or more MSISDN(s) 206 with one or more user account(s) 208. The BS node may comprise an archive of billing information corresponding with a user that opened the user account 208, such as an archive of CDRs (and information represented by the CDRs) associated with the user account 208, billing reports generated and/or sent by the BS node 102 associated with the user account 208, personal information (e.g., name, billing address, phone number, etc.) associated with the user account, etc. In some embodiments, the user account database 108 may comprise a permanent (or long term) record of billing information associated with the user account 208.

In some examples, the BS node 102 may comprise the BS node line identifier database 112. For instance, the BS node line identifier database 112 may store, at the BS node 102 and/or in communication with the processor(s) 204 of the BS node 102, one or more first association(s) 210 of the MSISDN(s) 206 and/or the IMSI(s) 207 with one or more line identifier(s) 212. In some examples, in response to receiving a cancelation request 214, the BS node 102 may generate the line identifier 212, for instance, via a line identifier generator 216. The line identifier generator 216 may generate the line identifier 212 to comprise an alphanumeric string, which may satisfy a formatting requirement of the BS node line identifier database 112. In some instances, the format of the line identifier 212 may be different from a format of the MSISDN 206, for example, the line identifier 212 may comprise less digits or bits than the MSISDN 206. In some examples, the BS node 102 may receive the line identifier 212, for instance, from another line identifier generator separate from the BS node 102. In some examples, the BS node 102 may receive and/or generate the line identifier 212 in response to receiving an indication that an association of a particular MSISDN to a particular user account is no longer accurate or available.

In some examples, the cancelation request 214 may include a cancelation timestamp 218, for instance, indicating a time associated with a cancelation of the user account 208 and/or a cancelation of a second association 220 of the MSISDN 206 with the user account 208. In some embodiments, the BS node 102 may generate the cancelation timestamp 218 at least partly in response to receiving the cancelation request 214. Additionally, or alternatively, the cancelation request 214 may include the cancelation timestamp 218 prior to the BS node 102 receiving the cancelation request 214. The BS node 102 may store the cancelation timestamp 218, for instance, in the BS node line identifier database 112 and/or in the user account database 108. The cancelation timestamp 218 may be stored with an association to the line identifier 212, the MSISDN 206, the IMSI(s) 207, and/or the user account 208.

In some examples, the BS node 102 may comprise a CS node adjustment generator 222, for instance, stored in the computer-readable storage media 202. The CS node adjustment generator 222 may generate adjustment message(s) 224 to send to the CS node 104, for instance, based at least in part on receiving the cancelation request 214, generating the line identifier 212, and/or storing the first association 210. The adjustment message 224 may include data representing the first association 210 of the MSISDN 206 and/or the IMSI(s) 207 with the line identifier 212. The adjustment message 224 may include a charging rate which may comprise payment plans and/or billing rates associated with the MSISDN 206. In some instance, the charging rate may comprise a post-paid plan charging rate of the user account 208. The adjustment message 224 may include an instruction to store the association 210, the MSISDN 206, the line identifier 212, and/or the charging rate at the CS node 104, as discussed in greater detail below regarding FIGS. 3 and 5.

In some instances, the BS node 102 may comprise a billing report generator 226 (e.g., stored in the computer-readable media 202) to generate a billing report 228. In some examples, the BS node 102 (e.g., via the billing report generator 226) may receive rated usage information (e.g., indicating a balance of an owed amount associated with user account 208), for instance, included in a modified rated TAP CDR 230 sent to the BS node 102 from the mediation node 106. The modified rated TAP CDR 230 may be based, at least in part, on the TAP CDR 120. The modified rated TAP CDR 230 is discussed in greater detail below regarding FIG. 4. The billing report generator 226 may apply bill generating techniques, such as for generating emails and/or snail mail documents, to generate the billing report 228. The billing report 228 may include the usage information, the rated usage information, the balance, and/or a location associated with the user account 208. The BS node 102 may send the billing report 228 to the location.

Figure 3:
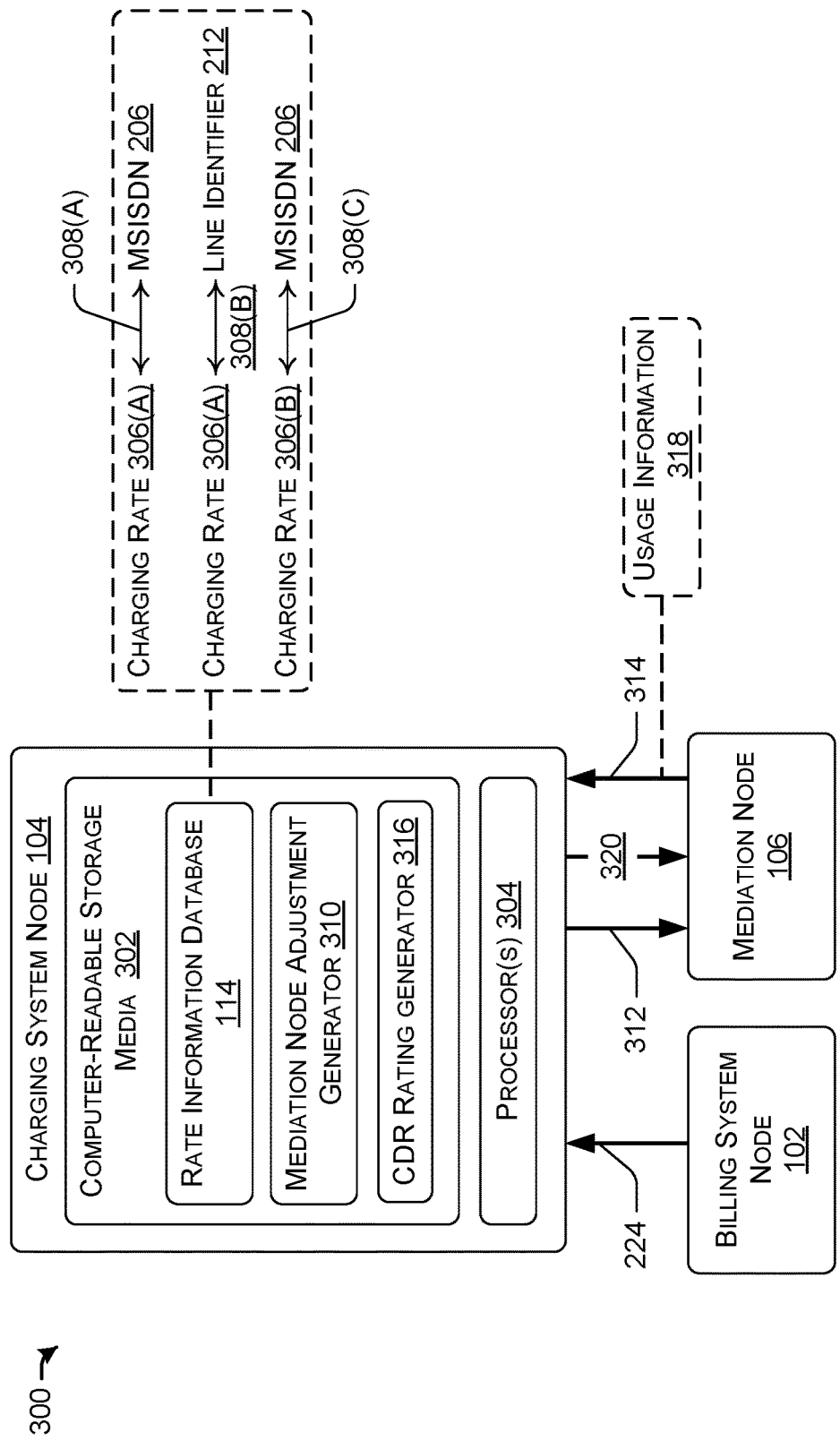
FIG. 3 depicts a schematic diagram of an example Charging System node, and operations of the Charging System node, the Billing System node, and the mediation node, which may form at least a portion of a system of FIG. 1.

FIG. 3 depicts a schematic diagram of an example system 300 including at least the CS node 104. FIG. 3 depicts one or more components of the CS node 104, one or more operations performed by the CS node 104, and one or more messages, CDRs, or other data transmissions between the CS node 104 and other nodes (e.g., the BS node 102 and the mediation node 106) of the system 100.

In some examples, the CS node 104 may comprise one or more computer-readable storage media 302, such as non-transitory computer-readable media including, but not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, a quantum-state storage device, genetic encoding storage device, combinations thereof, or any other medium that can be used to store information for access by an electronic computing device. Databases discussed herein, for instance stored at computer-readable storage media 302, may include one or more of a comma delimited list, a spreadsheet, an array, a NoSQL data structure, a hash-based data structure, an object-based data structure, or any other data type, data structure, and/or data system for storing retrievable data.

In some embodiments, the CS node 104 may comprise one or more processor(s) 304 such as a microprocessor, a microcomputer, a microcontroller, a digital signal processor, a central processing unit (CPU), a graphics processing unit (GPU), a quantum processor, combinations thereof, etc. Among other capabilities, the one or more processor(s) 304 may operate to fetch and execute computer-readable instructions stored in the one or more memory storage media 302 to perform the operations disclosed herein.

In some examples, the CS node 104 may store the rate information database 114 at computer-readable storage media 302. The rate information database 114 may store charging rate(s), for instance, a first charging rate 306(A) associated with the user account 208, for instance via a first association 308(A) with the MSISDN 206. The first charging rate 306(A) may represent a contractual obligation that a user associated with the user account 208 will be charged a particular rate for a particular usage, such as about $0.25 per minute for international calls, about $0.10 per international text message (e.g., SMS message), about $1.00 per megabyte (MB) of data for domestic roaming (e.g., over a threshold free amount of, for instance, 1 gigabyte), about $15 per MB of data for international roaming, or combinations thereof In some instances the first charging rate 306(A) may be associated with a prepaid plan (such that a user pays upfront and rated usage amounts are deducted from the prepaid balance) or a post-paid plan (such that the user is charged at the end of a month so that charges may accumulate throughout the month). The first charging rate 306(A) may include particular associations of rates for particular regions, times of day, devices, high-traffic or low-traffic periods, or combinations thereof. For instance, the CS node 104 may store the first charging rate 306(A) for a first region (e.g., the U.S.) which may be different than another charging rate for a second region (e.g., the E.U.).

In some embodiments, the CS node 104 may receive the adjustment message 224, for instance, from the BS node 102. The CS node 104 may remove, cancel, delete, omit, or otherwise change the first association 308(A) of the first charging rate 306(A) with the MSISDN 206. The CS node 104 may generate and store a second association 308(B) of the line identifier 212 with the first charging rate 306(A) and, in some instances, may delete the first association 308(A) and/or rewrite over a memory location storing the first association 308(A) with the second association 308(B). The CS node 104 may rewrite over a memory location storing the MSISDN 206 with the line identifier 212. In some examples, the CS node 104 may store a third association 308(C) of a second charging rate 306(B) associated with the MSISDN 206, for instance, after deleting the first association 308(A).

In some examples, the CS node 104 may send, via a mediation node adjustment generator 310, an adjustment CDR 312, for instance, based at least in part on receiving the adjustment message 224, storing the line identifier 212, and/or storing the second association 308(B). The adjustment CDR 312 may include data representing the first association 210 of the MSISDN 206 and/or the IMSI(s) 207 associated with the line identifier 212, and/or the cancelation timestamp 218. The adjustment CDR 312 may include an instruction to store the first association 210, the, the MSISDN 206, the IMSI(s) 207, the line identifier 212, and/or the cancelation timestamp 218 at the mediation node 106, as discussed in greater detail below regarding FIGS. 4 and 5.

In some embodiments, the CS node 104 may receive a CDR, such as a modified TAP CDR 314 from the mediation node 106. One or more CDR(s) received at the CS node 104 may comprise unrated CDR(s). The modified TAP CDR 314 received at the CS node 104 may be associated with a pre-paid plan or a post-paid plan. Upon receiving the modified TAP CDR 314, a CDR rating generator 316 may apply a charging rate, for instance, first charging rate 306(A) associated with the line identifier 212, to usage information 318 represented by the unrated TAP CDR 314. Accordingly, the CS node 104 may generate a rated TAP CDR 320 from the modified TAP CDR 314. The CS node 104 may send the rated TAP CDR 320 to the mediation node 106. The rated TAP CDR 320 may include an instruction to the mediation node 106 to format the rated TAP CDR 320, for instance, according to formatting requirements of the BS node 102, and to send a properly formatted rated TAP CDR 320 (e.g., a modified rated TAP CDR) to the billing node 102. In some examples, the CS node 104 may apply the charging rate associated with a post-paid plan (e.g., the charging rate received from the BS node 102 in the adjustment message 224) to the modified TAP CDR 314 in order to generate the rated TAP CDR 320. Accordingly, the rated TAP CDR 320 may be generated for the post-paid plan at the CS node 104 instead of at the BS node 102, such that computing resources of the BS node 102 may be conserved and/or allocated to other uses. Reducing rate charging performed at the BS node 102 may reduce memory storage requirements of the computer-readable media 202 of the BS node 102 because the BS node 102 does not need to store the logic to perform rate charging for post-paid plans. Therefore, eliminating/reducing a process for rating TAP CDRs 120 or modified TAP CDRs 314 for post-paid plans at the BS node 102 improves the overall efficiency of the systems disclosed herein.

Figure 4:
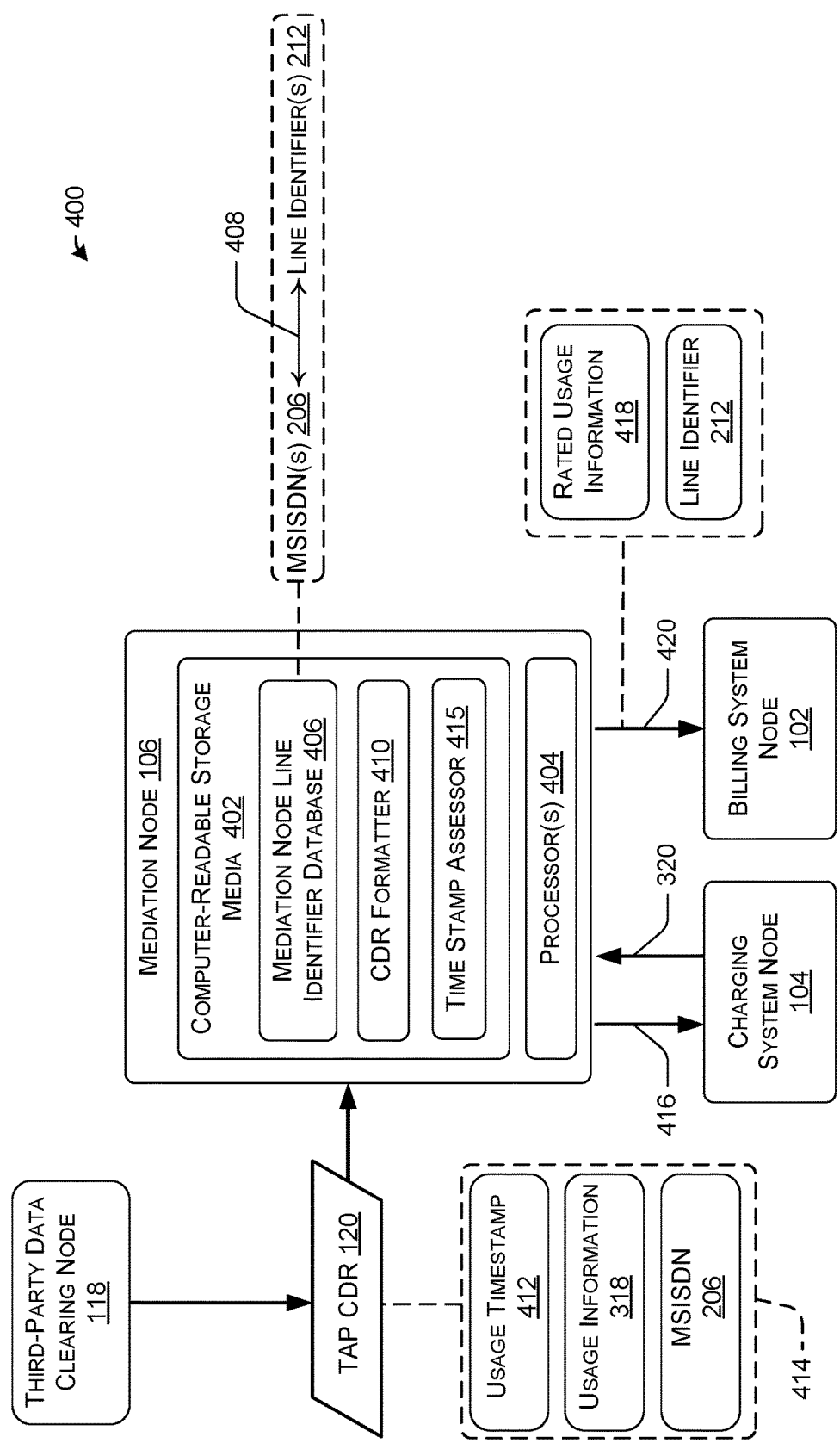
FIG. 4 depicts a schematic diagram of an example mediation node, and operations of the mediation node, the Billing System node, and the Charging System node, which may form at least a portion of a system of FIG. 1.

FIG. 4 depicts a schematic diagram of an example system 400 including at least the mediation node 106. FIG. 4 depicts one or more components of the mediation node 106, one or more operations performed by the mediation node 106, and one or more messages, CDRs, or other data transmissions between the mediation node 106 and other nodes (e.g., the BS node 102 and the CS node 104) of the system 100.

In some examples, the mediation node 106 may comprise one or more computer-readable storage media 402 such as non-transitory computer-readable media including, but not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, a quantum-state storage device, genetic encoding storage device, combinations thereof, or any other medium that can be used to store information for access by an electronic computing device. Databases discussed herein, for instance stored at computer-readable storage media 402, may include one or more of a comma delimited list, a spreadsheet, an array, a NoSQL data structure, a hash-based data structure, an object-based data structure, or any other data type, data structure, and/or data system for storing retrievable data.

In some embodiments, the mediation node 106 may comprise one or more processor(s) 404 such as a microprocessor, a microcomputer, a microcontroller, a digital signal processor, a central processing unit (CPU), a graphics processing unit (GPU), a quantum processor, combinations thereof, etc. Among other capabilities, the one or more processor(s) 404 may operate to fetch and execute computer-readable instructions stored in the one or more memory storage media 402 to perform the operations disclosed herein.

In some examples, the mediation node 106 may store a mediation node line identifier database 406, for instance, in the computer-readable storage media 402. The mediation node line identifier database 406 may store, at the mediation node 106 and/or in communication with the processor(s) 404 of the mediation node 106, one or more association(s) 408 of the MSISDN(s) 206 and/or the IMSI(s) 207 with one or more line identifier(s) 212, in some examples, in response to receiving the adjustment CDR 312. The mediation node 106 may store the cancelation timestamp 218 (which may be included in the adjustment CDR 312), for instance, at the mediation node line identifier database 406 and associated with the line identifier 212, the MSISDN 206, and/or the IMSI(s) 207.

In some embodiments, the mediation node 106 may store a CDR formatter 410, for instance, in the computer-readable storage media 402. The CDR formatter 410 may receive CDRs sent to the mediation node 106 (e.g., from the CS node 104, from the TAS node 110, and/or from the third-party data clearing node 118) and may apply stored CDR formats stored in a CDR format database in order to generate modified CDRs. For instance, the CDR formatter 410 may recognize an identity of a terminating node address associated with a received CDR (e.g., an intended recipient identifier), and the mediation node 106 may determine a format associated with the terminating node address, which may correspond to the BS node 102.

In some examples, the mediation node 106 may receive the TAP CDR 120, for instance, from the third-party data clearing node 118. The TAP CDR 120 may include usage information 318 corresponding to a usage (e.g., a phone call, a text, a data usage, roaming, etc. associated with the MSISDN 206 and/or the IMSI(s) 207), which may be collected by a third-party service provider, for instance, in a region outside the U.S. The TAP CDR 120 may include an indication of a location where the usage occurred, a usage timestamp 412 associated with the usage information 318, the MSISDN 206 and/or the IMSI(s) 207, and/or an association 414 of the MSISDN 206 and/or the IMSI(s) 207 with the usage information 318.

In some instances, the mediation node 106 may determine a receipt timestamp of the TAP CDR 120 representing a time that the mediation node 106 receives the TAP CDR 120, which (by way of example) may be up to 60-90 days later than a time indicated by the usage timestamp 412 because the mediation node 106 may receive the TAP CDR 120 a substantial delay after the usage occurred.

In some examples, upon receiving the TAP CDR 120, the mediation node 106 may determine whether the usage timestamp 412 indicates a first time occurring prior to or after a second time indicated by the cancelation timestamp 218. For instance, the mediation node 106, in some examples, via a timestamp assessor 415 (e.g., stored at the computer-readable media 402), may identify the usage timestamp 412 and the MSISDN 206 and/or the IMSI(s) 207 from the TAP CDR 120, determine that the MSISDN 206 and/or the IMSI(s) 207 corresponds to the cancelation timestamp 218 and/or the line identifier 212, and/or determine which of the first time or the second time occurred earlier.

In some instances, upon making a determination that the first time indicated by the usage timestamp 412 occurred before the second time indicated by the cancelation timestamp 218, the mediation node 106 (e.g., via the timestamp assessor 415) may determine to generate a modified TAP CDR 416 (which may be similar or identical to modified TAP CDR 314). For instance, the mediation node 106 may duplicate information of the TAP CDR 120 into the modified TAP CDR 416. The mediation node 106 may receive the line identifier 212 and/or the association 408 from the mediation node line identifier database 406, and the mediation node 106 may replace the MSISDN 206 and/or the IMSI(s) 207 in the TAP CDR 120 with the line identifier 212 to create the modified TAP CDR 416. In other words, the CDR formatter 410 may generate the modified TAP CDR 416 to include the line identifier 212 and omit the MSISDN 206. In some examples, the mediation node 106 may send the modified TAP CDR 416 to the CS node 104. The modified TAP CDR 416 may be associated with a post-paid plan.

In some embodiments, the mediation node 106 may receive the rated TAP CDR 320 from the CS node 104. The rated TAP CDR 320 may include rated usage information 418 representing a balance owed associated with the user account 208, which may be based at least in part on applying the charging rate 306(A) to the usage information 318 at the CS node 104. The mediation node 106 may apply formatting rules, for instance, via the CDR formatter 410, to the rated TAP CDR 320 to generate a modified rated TAP CDR 420 from the rated TAP CDR 320. For instance, the CDR formatter 410 may format the modified rated TAP CDR 420 according to formatting rules associated with the BS node 102. The mediation node 106 may send the modified rated TAP CDR 420 to the BS node 102. The modified rated TAP CDR 420 may include the rated usage information 418 and the line identifier 212. The modified rated TAP CDR 420 may omit the MSISDN 206 and/or include an absence of the MSISDN 206.

In some examples, components of the BS node 102 (e.g., processor 204, computer-readable storage media 202, etc.), the CS node 104 (e.g., processor 304, computer-readable storage media 304, etc.), and/or the mediation node 106 (e.g., processor 404, computer-readable storage media 402, etc.) may be stored separately as separate physical nodes, e.g., a physical distance apart. In some instances, components of the BS node 102, the CS node 104, and/or the mediation node 106 may at be at least partially combined, and/or entirely combined to form various node combinations.

Figure 5:
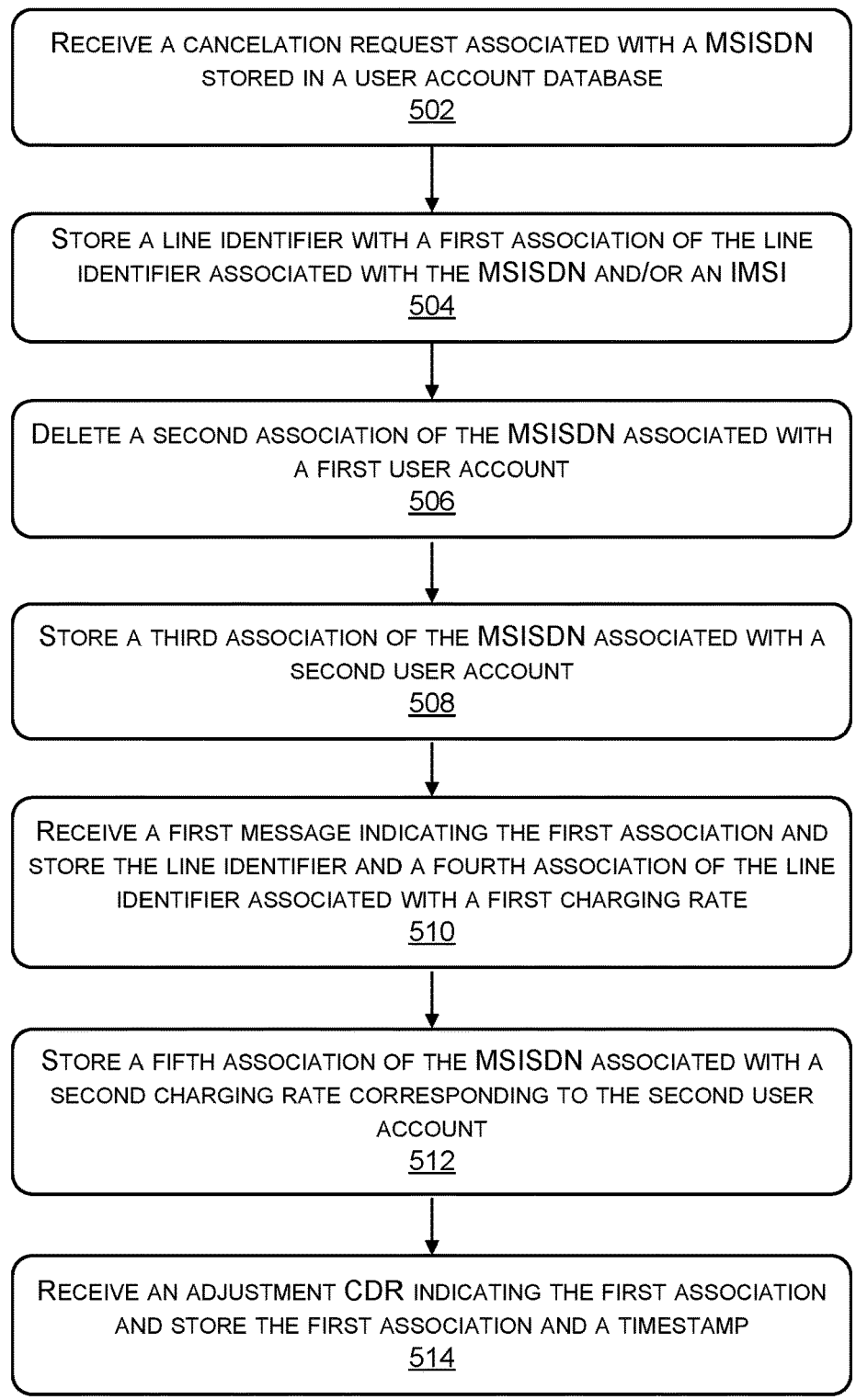
FIG. 5 depicts one or more example operations that may be performed by the systems, methods, and apparatuses of FIG. 1, and may include techniques for receiving a cancelation request and/or canceling an association of a Mobile Station International Subscriber Directory Number with a user account.

FIG. 5 depicts an example process of system 500 including techniques for canceling an MSISDN association based, at least in part on receiving the cancelation request 214. The techniques depicted in FIG. 5 may include adjusting the BS node 102, the CS node 104, and/or the mediation node 106 based, at least in part, on receiving the cancelation request 214. The system 500 depicted in FIG. 5 may be similar to, identical to, and/or form a portion of any of the systems disclosed herein.

At step 502, the process may include receiving a cancelation request associated with a MSISDN stored in a user account database. For instance, the BS node 102 may receive the cancelation request 214 associated with the MSISDN 206 stored at the user account database 108. The cancelation request 214 may include the MSISDN 206 and an indication (e.g., an instruction) that the BS node 102 remove, e.g., from the computer-readable media 202, the second association 220 of the MSISDN 206 associated with the user account 208, for instance, based on a user associated with the user account 208 performing a cancelation action for the user account 208. The cancelation request 214 may include the cancelation timestamp 218, for instance, indicating the time associated with the cancelation action of the user account 208 and/or a cancelation of the second association 220. In some instances, the BS node 102 may generate the cancelation timestamp 218 at least partly in response to receiving the cancelation request 214.

At step 504, the process may include storing a line identifier with a first association of the line identifier associated with the MSISDN and/or the IMSI(s) 207. For instance, the BS node 102 may store the line identifier 212 at the BS node line identifier database 112 with the first association 210 of the line identifier 212 associated with the MSISDN 206 and/or the IMSI(s) 207. For example, based in part on receiving the cancelation request 214 the BS node line identifier database 112 may store, at the BS node 102 and/or in communication with the processor(s) 204 of the BS node 102, one or more first association(s) 210 of the MSISDN(s) 206 and/or the IMSI(s) 207 with one or more line identifier(s) 212, based, at least in part, on receiving the cancelation request 214. In some examples, in response to receiving the cancelation request 214, the BS node 102 may generate the line identifier 212, for instance, via the line identifier generator 216. The line identifier generator 216 may generate the line identifier 212 to comprise an alpha-numeric string, which may satisfy formatting requirements of the BS node line identifier database 112.

At step 506, the process may include deleting a second association of the MSISDN associated with a user account. For instance, the BS node 102 may delete, from the user account database 108, the first association 210 of the MSISDN 206 associated with a first user account. For instance, the BS node 102 may remove, cancel, delete, omit, or otherwise change the first association 210. Upon performing step 506, the MSISDN 206 may be available for reassignment, for instance, to a second user account. In some instances, the BS node 102 may delete the first association 210 within seconds, minutes, one day, one week, and/or less than thirty days after receiving the cancelation request 214 such that the MSISDN is immediately or shortly thereafter available for reassignment to the second user account.

At step 508, the process may include storing a third association of the MSISDN associated with a second user account. For instance, the BS node 102 may store, in the user account database 108, the third association of the MSISDN 206 associated with the second user account. For instance, the BS node 102 may receive an indication that a second user associated with the second user account has purchased a subscription and/or a telephone service plan that includes an assignment of the MSISDN 206 to the second user, e.g., via the third association of the MSISDN 206 to the second user account in the user account database 108. In some examples, the BS node 102 may generate the third association of the MSISDN 206 associated with the second user account within seconds, minutes, one day, one week, and/or less than thirty days after receiving the cancelation request 214. Accordingly, the system 500 may efficiently manage the MSISDNs by reassigning MSISDNs quickly after receiving the cancelation request 214, and without needing to store unused/canceled MSISDNs for an extended time period after receiving the cancelation request 214. In some instances, the MSISDNs may comprise a scarce resource, such as in high-density population areas, and so quickly reassigning MSISDNs may expand a number of users that can receive MSISDN assignments from the service provider managing the MSISDNs.

At step 510, the process may include receiving a first message indicating the first association and storing the line identifier and a fourth association of the line identifier associated with a first charging rate. For instance, the CS node 104 may receive the first message indicating the first association 210 and store, at the rate information database 114, the line identifier 212. The CS node 104 may receive the adjustment message 224, for instance, from the BS node 102. The CS node 104 may remove, cancel, delete, omit, or otherwise change the first association 308(A) of the first charging rate 306(A) with the MSISDN 206, rewriting over a memory location that stored the first association 308(A) with the fourth association, and/or rewriting over a memory location that stored the MSISDN 206 and/or the IMSI(s) 207 with the line identifier 212.

At step 512, process may include storing a fifth association of the MSISDN associated with a second charging rate corresponding to the second user account. For instance, the CS node 104 may store, at the rate information database 114 the fifth association of the MSISDN 206 associated with the second charging rate corresponding to the second user account. For instance, the fifth association may comprise the third association 308(C) depicted in FIG. 3, and the second charging rate may comprise second charging rate 306(B). For instance, the CS node 104 may receive an indication from the BS node 102 that the second user associated with the second user account purchased a subscription, a telephone service plan, or otherwise initiated an assignment of the MSISDN 206 to the second user account. In some examples, the CS node 104 may generate the fifth association of the MSISDN 206 associated with the second charging rate within seconds, minutes, one day, one week, and/or less than thirty days after the BS node 102 receives the cancelation request 214, and/or after receiving the indication from the BS node.

At step 514, the process may include receiving an adjustment CDR indicating the first association and storing the first association and a timestamp. For instance, the mediation node 106 may receive the adjustment CDR 312 indicating the first association 210 of the line identifier 212 with the MSISDN 206 and/or the IMSI(s) 207, and store, at the mediation node line identifier database 406, the first association 210 with the cancelation timestamp 218. The adjustment CDR 312 may be generated and/or sent from the CS node 104 to the mediation node 106. In some examples, the CS node 104 may send, via the mediation node adjustment generator 310, the adjustment CDR 312, for instance, based at least in part on receiving the adjustment message 224 at the CS node 104, storing the line identifier 212 at the CS node 104, and/or storing the association 308(B) at the CS node 104. The adjustment CDR 312 may include data representing the first association 210 of the MSISDN 206 and/or the IMSI(s) 207 associated with the line identifier 212. The adjustment CDR 312 may include an instruction to store the first association 210, the MSISDN 206 and/or the IMSI(s) 207, the line identifier 212, and/or the cancelation timestamp 218 at the mediation node 106

In some instances, the mediation node 106 may store, at the mediation node line identifier database 406, the first association 210, the MSISDN 206 and/or the IMSI(s) 207, and/or the cancelation timestamp 218. For instance, the first association 210 of the line identifier 212 associated with the MSISDN 206 may be stored based, at least in part, on the mediation node 106 receiving the adjustment CDR 312. In some examples, the mediation node 106 may store the first association 210 with the cancelation timestamp 218, for instance, indicating the time associated with a cancelation of the user account 208 and/or a cancelation of the second association 220 of the MSISDN 206 with the user account 208. In some embodiments, the BS node 102 may generate the cancelation timestamp 218 at least partly in response to receiving the cancelation request 214. In some examples, the CS node 104 may generate the cancelation timestamp 218, for instance, at least partly in response to receiving the adjustment message 224. In some embodiments, the mediation node 106 may generate the cancelation timestamp 218, for instance, at least partly in response to receiving the adjustment CDR 312. In some instances, any of the steps 502-514 may be performed at least partly in response to any other of the steps 502-514, such as at least partly in response to the system receiving the cancelation request 214.

Figure 6:
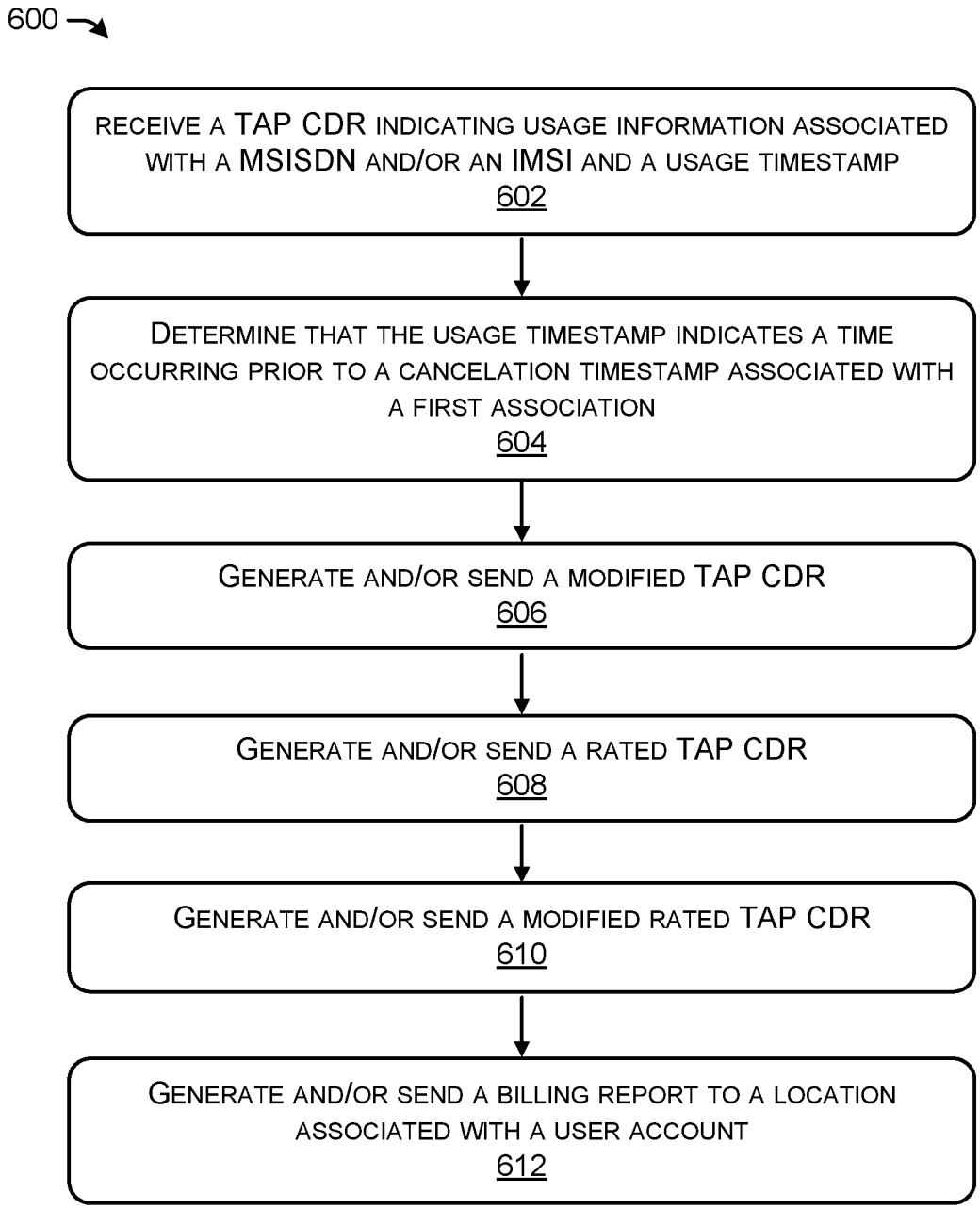
FIG. 6 depicts one or more example operations that may be performed by the systems, methods, and apparatuses of FIG. 1, and may include techniques for generating a billing report based, at least in part, on receiving a Telephone Account Procedure Call Detail Record.

FIG. 6 depicts an example process of system 600 including techniques for generating the billing report 228. In some instances, the billing report 228 may be generated by the BS node 102 based, at least in part on receiving (e.g., at the mediation node 106) the TAP CDR 120. The system 600 depicted in FIG. 6 may be similar to, identical to, and/or form a portion of any of the systems disclosed herein.

At step 602, the process may include receiving a TAP CDR indicating usage information associated with a MSISDN and/or an IMSI and a usage timestamp. For instance, the mediation node 106 may receive the TAP CDR 120 indicating the usage information 318 associated with the MSISDN 206 and/or the IMSI(s) 207 and the usage timestamp 412. The TAP CDR 120 may be sent to the mediation node 106 from the third-party data clearing node 118. The TAP CDR 120 may include the usage information 318, which may be collected by a third-party service provider, for instance, in a region outside the U.S. The TAP CDR 120 may include an indication of the location where the usage (e.g., phone call, text, data usage, roaming, etc. associated with the MSISDN 206) occurred, the usage timestamp 412 associated with the usage information 318, and/or the association 414 of the MSISDN 206 and/or the IMSI(s) 207 with the usage information 318.

At step 604, the process may include determining that the usage timestamp indicates a time prior to a cancelation request associated with a first association. For instance, the mediation node 106 may determine that the usage timestamp 412 indicates a first time occurring prior to a second time indicated by the cancelation timestamp 218, which may be associated with the first association 210 and/or the line identifier 212. For instance, the mediation node 106, in some examples, via the timestamp assessor 415 (e.g., stored at the computer-readable media 402), may identify the usage timestamp 412 and the MSISDN 206 and/or the IMSI(s) 207 from the TAP CDR 120, determine that the MSISDN 206 and/or the IMSI(s) 207 corresponds to the cancelation timestamp 218 and/or the line identifier 212, and determine which of the first time or the second time occurred earlier.

At step 606, the process may include generating and/or sending a modified TAP CDR. For instance, the mediation node 106 may generate the modified TAP CDR 416 and send the modified TAP CDR 416 to the CS node 104. The modified TAP CDR 416 may include the line identifier 212 with a second association to the usage information 318. For instance, generating the modified TAP CDR 416 may be based, at least in part on the determination that the usage timestamp 412 indicates the first time occurring prior to the second time indicated by the cancelation timestamp 218. The mediation node 106 may duplicate information of the TAP CDR 120 into the modified TAP CDR 416. The mediation node 106 may receive the line identifier 212 and/or the association 408 from the mediation node line identifier database 406, and the mediation node 106 may replace the MSISDN 206 and/or the IMSI(s) 207 with the line identifier 212 in the modified TAP CDR 416. In other words, the CDR formatter 410 of the mediation node 106 may generate the modified TAP CDR 416 to include the line identifier 212 and omit the MSISDN 206 and/or the IMSI(s) 207. The CS node 104 may receive the modified TAP CDR 416.

At step 608, process may include generating and/or sending a rated TAP CDR. For instance, the CS node 104 may generate the rated TAP CDR 320 and send the rated TAP CDR 320 to the mediation node 106. The rated TAP CDR 320 may be generated based, at least in part, on the charging rate associated the line identifier 212 and stored at the rate information database 114. For instance, the CDR rating generator 316 (which may be stored at computer-readable media 302 of the CS node 104) may apply the charging rate 306 to the usage information 318 represented by the modified TAP CDR 416 in order to generate the rated TAP CDR 320. The rated TAP CDR 320 may include an instruction to the mediation node 106 to format the rated TAP CDR 320, for instance, according to formatting requirements of the BS node 102, and to send a properly formatted rated TAP CDR 320 (i.e., the modified rated TAP CDR 420) to the billing node 102. The mediation node 106 may receive the rated TAP CDR 320.

At step 610, process may include generating and/or sending a modified rated TAP CDR. For instance, the mediation node 106 may generate the modified rated TAP CDR 420 and send the modified rated TAP CDR 420 to the BS node 102. In some instances, the modified rated TAP CDR 420 may be based, at least in part, on the rated TAP CDR 320. For instance, the modified rated TAP CDR 420 may include the balance associated with the usage information 318 of the TAP CDR 120 (e.g., generated by the CS node 104 applying the charging rate to the usage information 318), which may be formatted by the mediation node 106. The mediation node 106 may apply formatting rules, for instance, via the CDR formatter 410 to the rated TAP CDR 320, generating the modified rated TAP CDR 420. For instance, the CDR formatter 410 may format the modified rated TAP CDR 420 according to formatting rules associated with the BS node 102. The modified rated TAP CDR 420 may include the line identifier 212 associated with the rated usage information and/or the balance. The BS node 12 may receive the modified rated TAP CDR 420

At step 612, process may include generating and/or sending a billing report to a location associated with a user account. For instance, the BS node 102 may generate the billing report 228. Generating the billing report 228 may be based, at least in part, on receiving the line identifier 212 included in the modified rated TAP CDR 420, the rated usage information in the modified rated TAP CDR 420, the balance generated by the CS node 104, and/or the first association 210 (stored at the BS node line identifier database 112) associating the line identifier 212 with the MSISDN 206. The BS node 102 may send the billing report 228. For instance, the BS node 102 may send the billing report 228 as an invoice to the user associated with the user account. In some examples, the BS node 102 may send the billing report 228 to an archive for storage for legal documentation and/or accounting purposes. In some instances, any of the steps 602-612 may be performed at least partly in response to any other of the steps 602-612, such as at least partly in response to receiving the TAP CDR 120.

Although FIGS. 5 and 6 illustrate example operations, the described operations in these figures (and all other methods and operations disclosed herein) may be performed in other orders different than those illustrated in FIGS. 5 and 6 and multiple steps may be performed simultaneously or in parallel. Furthermore, in some embodiments, one or more operations illustrated in FIGS. 5 and 6 may be omitted, repeated, and/or combined with other operations illustrated in FIGS. 5 and 6, or any other operations and components discussed in this disclosure. In some instances, the operations illustrated in FIGS. 5 and 6 may be performed in multiple iterations for instance, to manage thousands, or even millions of MSISDNs, user accounts, and/or cancelation requests occurring around the globe.

Conclusion

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A computing device comprising:
   one or more processors; and
   one or more computer-readable media storing computer-executable instructions that, when executed, cause the one or more processors to perform operations comprising:
   receiving, from a Billing System (BS) node, an indication that a Mobile Station International Subscriber Directory Number (MSISDN) or an International Mobile Subscriber Identity (IMSI) is associated with a line identifier;
   storing, based at least in part on the indication, the line identifier at a database;
   receiving, from the BS node, a charging rate associated with the line identifier;
   storing the charging rate associated with the line identifier;
   receiving, from a mediation node, a Call Detail Record (CDR) indicating usage information associated with the line identifier;
   generating, based at least in part on the CDR and the charging rate, a rated CDR associated with the line identifier; and
   sending, to the mediation node, the rated CDR.

2. The computing device of claim 1, wherein the line identifier comprises a first format and the MSISDN or the IMSI comprises a second format that is different from the first format.

3. The computing device of claim 1, wherein the operations further comprise:
   determining a first timestamp associated with the usage information;
   determining a second timestamp associated with storing the line identifier at the database in place of the MSISDN; and
   generating the rated CDR is based at least in part on a determination that the first timestamp indicates a time prior to the second timestamp.

4. The computing device of claim 1, wherein the operations further comprise:
   sending, to the mediation node and based at least in part on storing the line identifier at the database in place of the MSISDN or the IMSI, an instruction for the mediation node to store the MSISDN or the IMSI associated with the line identifier.

5. The computing device of claim 1, wherein the computing device comprises a Charging System node.

6. The computing device of claim 1, wherein the charging rate is associated with an amount of payment by a user, the payment comprising a prepayment at a beginning of a month or for a post-payment for an end of a month.

7. The computing device of claim 1, wherein the charging rate is associated with at least one of a geographical region, a time of day, or a period of time associated with an amount of traffic meeting or exceeding a threshold.

8. The computing device of claim 1, wherein generating the rated CDR further comprises:
   generating a modified Telephone Account Procedure (TAP) CDR associated with a service plan associate with a user, the modified TAP CDR being associated with formatting requirements of the BS node or a Charging System (CS) node; and
   generating, as a rated TAP CDR, the rated CDR based at least in part on the modified TAP CDR.

9. A computing device comprising:
   one or more processors; and
   one or more computer-readable media storing computer-executable instructions that, when executed, cause the one or more processors to perform operations comprising:

storing, by a database, a line identifier associated with a Mobile Station International Subscriber Directory Number (MSISDN) or an International Mobile Subscriber Identity (IMSI);

receiving, from a Billing System (BS) node, a charging rate associated with the line identifier;

storing the charging rate associated with the line identifier;

receiving, from a mediation node, a Call Detail Record (CDR) indicating usage information associated with the line identifier;

generating, based at least in part on the CDR and the charging rate, a rated CDR associated with the line identifier; and sending, to the mediation node, the rated CDR.

10. The computing device of claim 9, wherein storing the line identifier further comprises:

receiving, from the BS node, an indication that the MSISDN or the IMSI is associated with the line identifier; and storing, based at least in part on the indication, the line identifier.

11. The computing device of claim 9, wherein the line identifier comprises a first format and the MSISDN or the IMSI comprises a second format that is different from the first format.

12. The computing device of claim 9, wherein the operations further comprise:

determining a first timestamp associated with the usage information;

determining a second timestamp associated with storing the line identifier at the database in place of the MSISDN or the IMSI; and generating the rated CDR is based at least in part on a determination that the first timestamp indicates a time prior to the second timestamp.

13. The computing device of claim 9, wherein the operations further comprise:

sending, to the mediation node and based at least in part on storing the line identifier at the database in place of the MSISDN or the IMSI, an instruction for the mediation node to store the MSISDN or the IMSI associated with the line identifier.

14. The computing device of claim 9, wherein the computing device comprises a Charging System node.

15. The computing device of claim 9, wherein generating the rated CDR further comprises:

generating a modified Telephone Account Procedure (TAP) CDR associated with a service plan associate with a user, the modified TAP CDR being associated with formatting requirements of the BS node or a Charging System (CS) node; and generating, as a rated TAP CDR, the rated CDR based at least in part on the modified TAP CDR.

16. A method comprising:

storing, by a database, a line identifier associated with a Mobile Station International Subscriber Directory Number (MSISDN) or an International Mobile Subscriber Identity (IMSI);

receiving, from a Billing System (BS) node, a charging rate associated with the line identifier;

storing the charging rate associated with the line identifier;

receiving, from a mediation node, a Call Detail Record (CDR) indicating usage information associated with the line identifier;

generating, based at least in part on the CDR and the charging rate, a rated CDR associated with the line identifier; and sending, to the mediation node, the rated CDR.

17. The method of claim 16, wherein storing the line identifier further comprising:

receiving, from the BS node, an indication that the MSISDN or the IMSI is associated with the line identifier; and storing, based at least in part on the indication, the line identifier.

18. The method of claim 16, wherein the line identifier comprises a first format and the MSISDN or the IMSI comprises a second format that is different from the first format.

19. The method of claim 16, further comprising:

determining a first timestamp associated with the usage information;

determining a second timestamp associated with storing the line identifier at the database in place of the MSISDN or the IMSI; and generating the rated CDR is based at least in part on a determination that the first timestamp indicates a time prior to the second timestamp.

20. The method of claim 16, further comprising:

sending, to the mediation node and based at least in part on storing the line identifier at the database in place of the MSISDN or the IMSI, an instruction for the mediation node to store the MSISDN or the IMSI associated with the line identifier.

* * * * *